United States Patent
Espriu (10) Patent No.: US 7,264,252 B2
(45) Date of Patent: Sep. 4, 2007

(54) RUBBER AUXILIARY SUSPENSION WITH STAGES UNDER TENSION FOR VEHICLE AXLES IN GENERAL

(76) Inventor: Roberto Tapia Espriu, Av. Dolores Hidalgo No. 747, Cd Industrial, Irapuato, GTO 36541 (MX)

( * ) Notice: Subject to any disclaimer, the term of this patent is extended or adjusted under 35 U.S.C. 154(b) by 471 days.

(21) Appl. No.: 10/475,749

(22) PCT Filed: Apr. 24, 2002

(86) PCT No.: PCT/MX02/00033

§ 371 (c)(1),
(2), (4) Date: May 20, 2004

(87) PCT Pub. No.: WO02/085651

PCT Pub. Date: Oct. 31, 2002

(65) Prior Publication Data

US 2004/0245740 A1    Dec. 9, 2004

(30) Foreign Application Priority Data

Apr. 24, 2002  (MX) .................. PA/a/2001/004085

(51) Int. Cl.
*B60G 11/00* (2006.01)
(52) U.S. Cl. ............................................. 280/124.175
(58) Field of Classification Search ......... 280/124.175, 280/124.102, 124.165, 124.169; 267/25, 267/30, 270, 271
See application file for complete search history.

(56) References Cited

U.S. PATENT DOCUMENTS

| | | | |
|---|---|---|---|
| 1,452,693 A | 4/1923 | Lord | |
| 1,835,575 A | 12/1931 | Sanders | |
| 2,237,056 A | 4/1941 | Manning | |
| 2,467,548 A | 4/1949 | Bradley | |
| 2,802,663 A | 8/1957 | Hovind | |
| 2,988,352 A | 6/1961 | Masser | |
| 3,087,716 A | 4/1963 | Nilsson | |
| 3,170,712 A | * | 2/1965 | Hildebrandt et al. ....... 280/6.15 |
| 3,491,994 A | * | 1/1970 | Reynolds ..................... 267/269 |
| 3,596,923 A | * | 8/1971 | Nakamura et al. .... 280/124.175 |
| 4,125,276 A | 11/1978 | Levasseur | |
| 5,007,660 A | * | 4/1991 | Orndorff et al. ...... 280/124.102 |
| 5,255,936 A | 10/1993 | Velazquez | |
| 5,337,997 A | * | 8/1994 | Hockney ..................... 248/596 |
| 6,019,384 A | 2/2000 | Finck | |
| 6,129,369 A | * | 10/2000 | Dudding .............. 280/124.175 |

* cited by examiner

*Primary Examiner*—Faye M. Fleming
(74) *Attorney, Agent, or Firm*—Stephen W. Melvin (57) ABSTRACT

An auxiliary suspension system operating on stages of loaded rubber for axles of vehicles in general includes a pair of concentric tubes, one outer and one inner, with rubber applied to the surfaces of contact. As the tubes turn one inside the other, they put the rubber into torsion. The system can have two integrated phases or it can be a hybrid system. The suspension system connects the vehicle chassis to the axle of the wheels using a lever arm attached to the outer tube and a support that holds the inner tube and a system of torsion control at the other end. The suspension system has features including a torsion lever that changes longitudinal movement of the tensioning element into angular movement that is transmitted to the anchoring tube to stretch the rubber, and a torsion arm or crossbeam that is fixed to a covering box at one end and that has a hole where a fork-shaped tensioning element passes, providing a supporting point to the tensioning element and generating a longitudinal movement to permit torsion adjustment of the rubber to a desired level.

8 Claims, 8 Drawing Sheets

RUBBER AUXILIARY SUSPENSION WITH STAGES UNDER TENSION FOR VEHICLE AXLES IN GENERAL

SUMMARY OF THE INVENTION

This invention relates to a novel auxiliary suspension system in stages for vehicles in general, applied to an axle, tandem axles or auxiliary wheels.

When using a suspension according to an embodiment of this invention, rear suspensions (passengers and cargo) are softened when loads are in a range of 0% to 50% of the load capacity, resulting, with this suspension mechanism, in greater comfort in this range for these vehicles users, while when subjected to over 50% of the load capacity, only springs, such as in present vehicles, operate.

Another aspect of an embodiment of the present invention is that this suspension has a 25% load capacity by virtue of the fact that one system is preferably installed in a vehicle chassis on each side. The system attaches to the bumper's fastening points or other ones contained in the chassis and/or back hangar and the spring bushing will be coupled to the lever arm bushing of the suspension mechanism through a swing. Therefore the two parts would provide support up to 50% of the load capacity and the rest would be shared by the two springs. That is to say, the suspension mechanism will work with the springs from 0% to 50% of load, considering this as a first stage of operation and when over 50% of the load is applied, spring action or function would be started, thus springs work from 50% to 100% of the load, this being a second stage of operation.

The auxiliary suspension system of the present invention is comprised of a pair of concentric tubes with rubber added to its contact surfaces, such that when one tube turns inside the other one, the rubber is put into torsion. This system can have two integrated stages or it can be a hybrid system, using as a first or second stage some suspension system already installed in the vehicle, which can be a spring or conventional metal sheets system. The suspension of an embodiment of the present invention couples the vehicle chassis to the wheel axle using a lever arm attached to the outer tube and a support which holds the inner tube and its torsion control system at the other end. These parts and some other characteristics of the suspension mechanism are described more clearly below.

DETAILED DESCRIPTION

The suspension system of the present invention can be applied to an axle, tandem axles or to auxiliary wheels. First, an embodiment of the invention will be described as applied to a simple axle with two wheels and the operation will be described as a first stage of a system with metal sheets suspension. Second, an alternative embodiment will be described as applied to a suspension of two integrated stages with loaded rubber.

Figure 1:
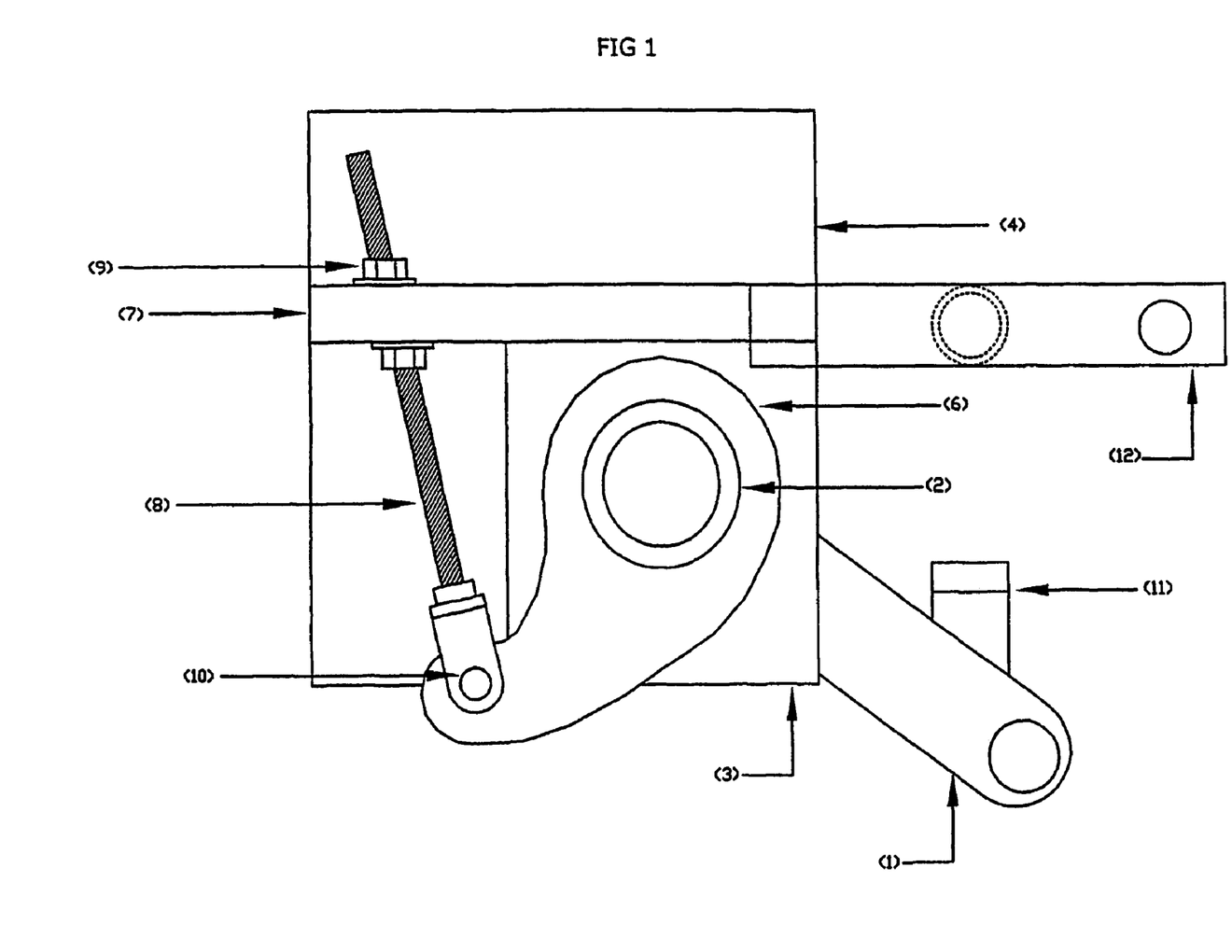
FIG. 1 shows a lateral view of the loaded rubber suspension of a stage.
Figure 2:
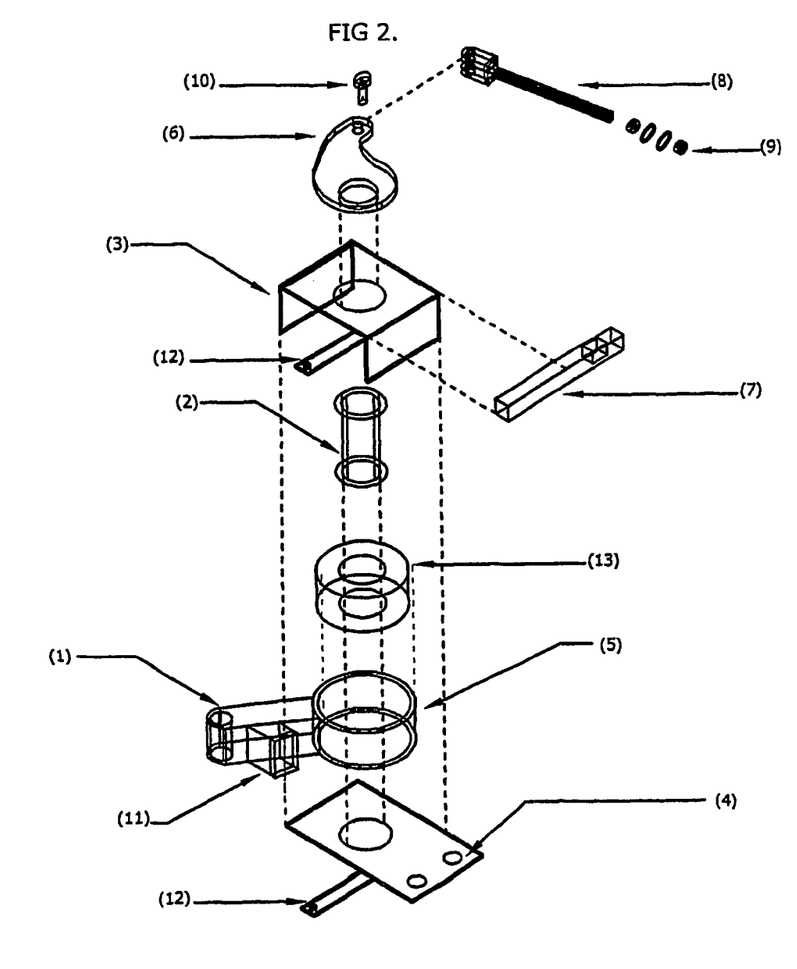
FIG. 2 shows the exploded view of the suspension of a stage.
Figure 4:
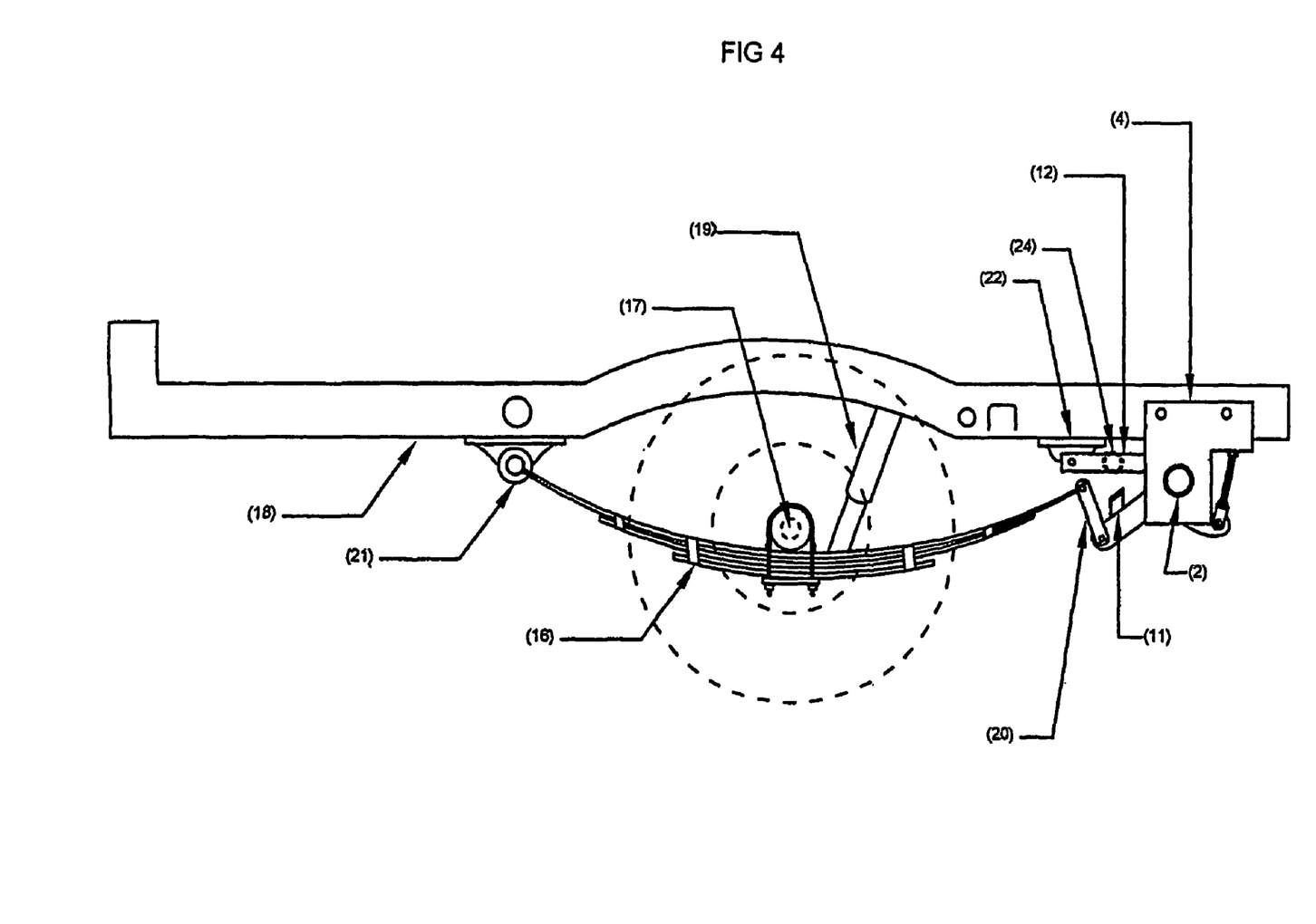
FIG. 4 shows assembly of the loaded rubber suspension as a first stage together with a suspension of metal sheets which acts as a second stage.

In FIGS. 1 and 2 number (1) is a lever used to transmit to the reaction tube (5) or outer tube in FIG. 2 the force coming from shaft (17) in FIG. 4 through steel sheets springs (16) in FIG. 4 which are attached to the lever by means of swing (20) in FIG. 4. Number (2) in FIGS. 1 and 2 is an anchoring tube or inner steel tube which transmits to the rubber, anchored through vulcanization of its outer surfaces, an angular movement which causes it to stretch the rubber until reaching the desired adjustment point. Number (3) in FIGS. 1 and 2 is a covering or steel plate with three holes, two of equal diameters which serve as fastening points and one of a bigger diameter serving to hold anchoring tube (2) in FIG. 2 when the system is loaded. This plate is screwed on the chassis of the vehicle.

Number (5) in FIG. 2 is a reaction tube and it is used to receive a force coming from lever (1) in FIG. 2 and to transmit it to the rubber added to its inner surface which causes it to generate a reaction force that balances system. Number (6) in FIGS. 1 and 2 is a torsion lever and it changes longitudinal movement of the tensioning element into an angular movement which is transferred to the anchoring tube to stretch the rubber. Number (7) in FIGS. 1 and 2 is a torsion arm or steel crossbeam attached to the covering box (3) in FIG. 2 at one end and having a hole through which passes the fork shaped tensioning element (8) in FIGS. 1 and 2 which functions to give a supporting point for attaching the fork shaped tensioning element (8) in FIG. 2.

Number (8) in FIGS. 1 and 2 is a fork-shaped tensioning element and it serves to generate a longitudinal movement to permit adjustment of the rubber torsion to the desired level. Number (9) in FIGS. 1 and 2 are adjustment nuts and they serve first to change the circular movement of nuts over the threads of the fork-shaped tensioning element (8) in FIG. 2, into a controlled longitudinal movement and second they serve as counter nuts to make sure that when the adjustment is made it does not move. Bolt (10) in FIG. 2 is a small steel bar and it serves to join the fork-shaped tensioning element to the torsion lever. Number (11) in FIGS. 1 and 2 is a stop member and it serves to limit the displacement of the lever arm and it determines the working point of each stage, because when the stop member stops the arm, this prevents the transmission of more force to reaction tube (5) in FIG. 2 and from that point only the second stage operates, such as in this case is springs of steel sheets (16) in FIG. 4.

Number (12) in FIGS. 1 and 2 is a supporting crossbeam or steel support that allows placement of the run limit (24) in FIG. 4 and to hold the complete suspension system box (between plate (3) and box base (4) in FIG. 2) to the back hangar (22) in FIG. 4 and accordingly it is firmly held to the chassis on the part designed to support the load. Rubber part (13) in FIGS. 2 and 7 is a compound of natural and synthetic rubber vulcanized and added to contact the surfaces of the reaction and anchoring tubes which permits it to be resistant to fatigue, torsion, vibration, breaking, etc., as such, it serves to have the system balanced throughout the load range which the suspension of a stage is designed for, and it also can be used with a steel core (not shown).

Figure 6:
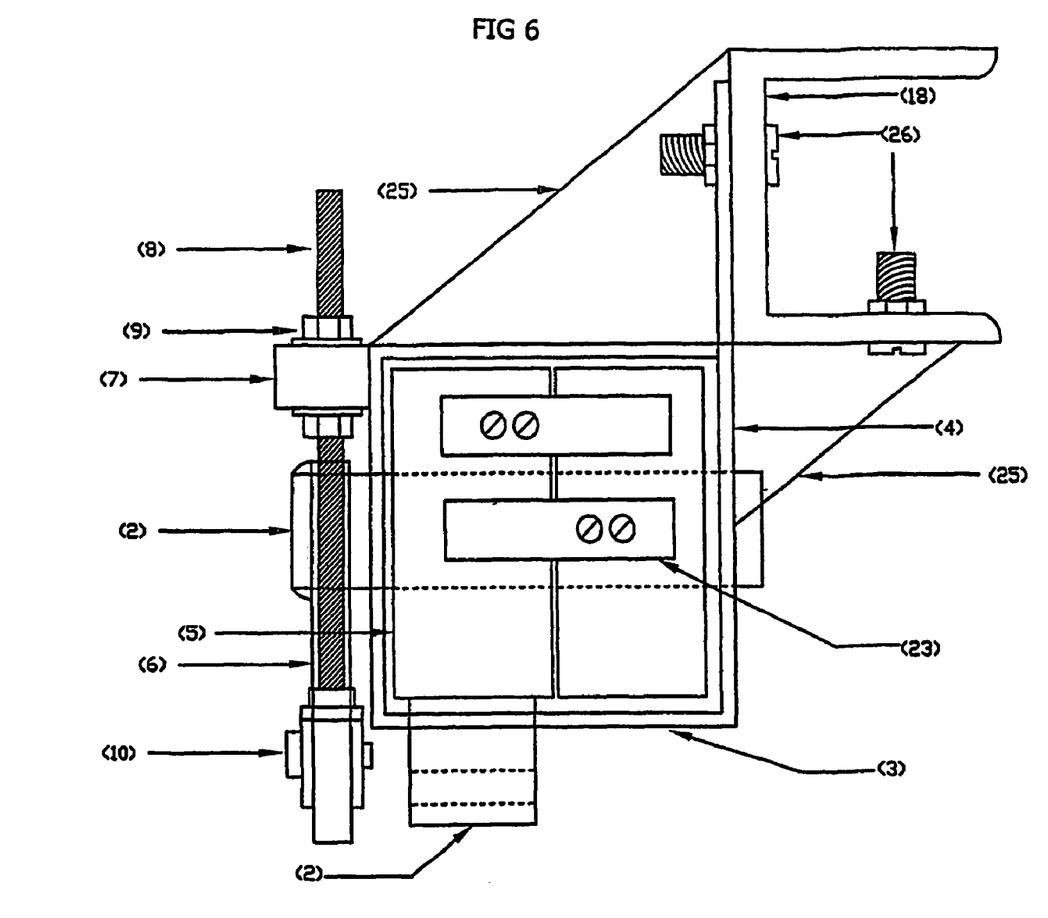
FIG. 6 shows a rear view of a suspension of two integrated rubber stages.
Figure 7:
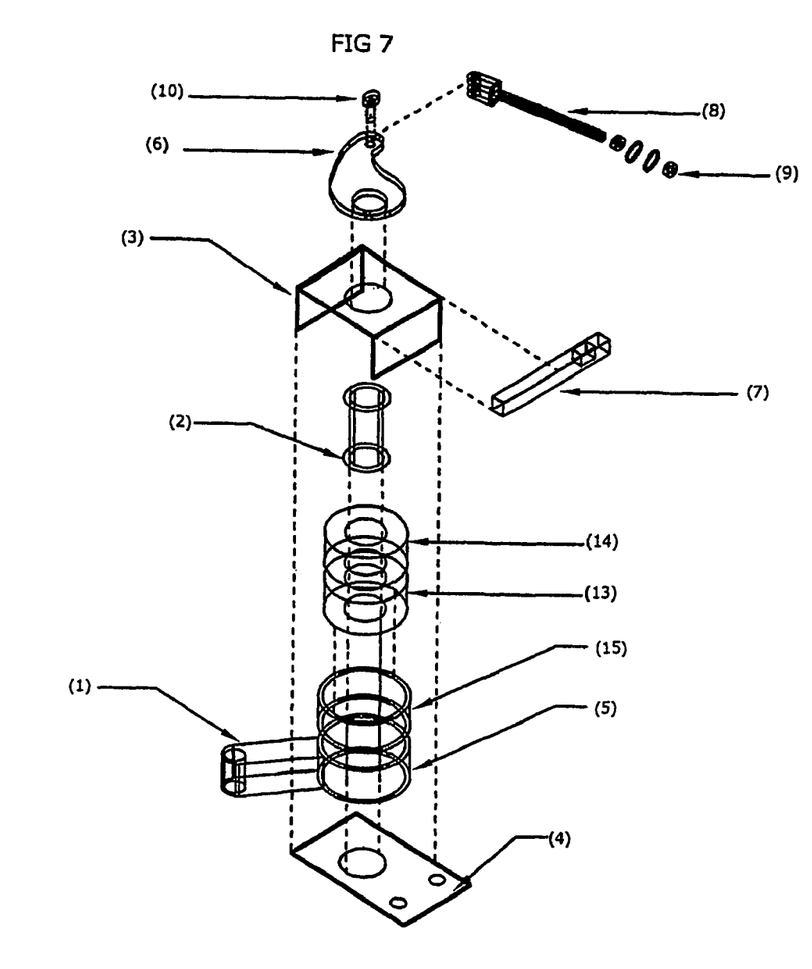
FIG. 7 shows an exploded view of a suspension of two loaded rubber stages.

Considering the second stage of the suspension system, the rubber part (14) in FIG. 7 is a compound of natural and synthetic rubber vulcanized and applied to contact the surfaces of anchoring tubes (2) in FIG. 2 and second stage reaction tubes (15) in FIG. 7. The rubber is preferably resistant to fatigue, torsion, vibration, breaking, etc., and it serves to have the system balanced throughout the load range for which the second stage is designed for. Number (15) in FIG. 7 is the second stage reaction tube and has as a purpose to receive a force coming from actuator (23) in FIG. 6, attached to the first stage and to transmit this force against the actuator attached to the second stage and then against the rubber applied to its inner surface. This action will generate a reaction force to balance the system with the forces of the first and second stages being combined.

Figure 8:
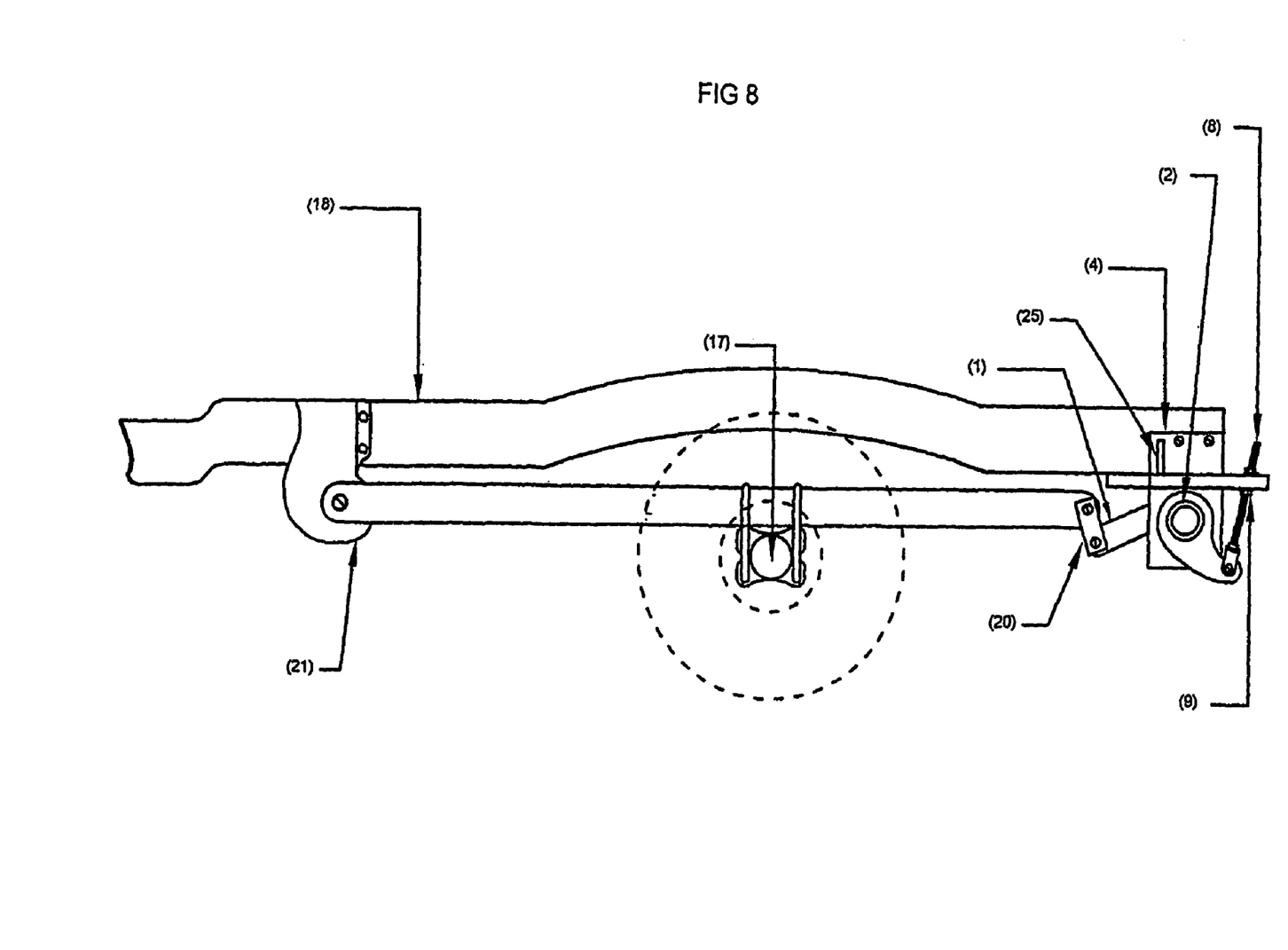
FIG. 8 shows the assembly of one side of a two stage suspension in a vehicle with a shaft, two wheels and a chassis.

Number (16) in FIG. 4 are the springs of metallic sheets and they are part of suspension systems in wide use and they are used as a second stage when the system is a hybrid system and they have as a purpose to flex themselves and to change a vertical movement provoked by variations of load or surface into mixed movements with vertical and horizontal components. Number (17) in FIG. 4 identifies the vehicle axle which holds the tires on its ends and the axle is held to the springs through holders and serves as a way to couple the vehicle floor and the suspension. Vehicle chassis (18) in FIG. 4 is the rigid steel frame over which the suspension box is attached and it is the connection between the suspension system and the vehicle body. Shock absorber (19) in FIG. 4 is a mechanism used to reduce shock and speed of vertical movement. Swing (20) in FIGS. 4 and 8 is a pair of crossbeams with rubber or nylon bushings which couple springs of metallic sheets in FIG. 4 or a support bar in FIG. 8 to the lever. Front hangar (21) in FIGS. 4 and 8 is a steel part attached to the chassis of the vehicle in a place designed to hold the load in front of the suspension. Back hangar (22) in FIGS. 4 and 8 is a steel part attached to the chassis of the vehicle in a place designed to support loading in the rear.

Figure 3:
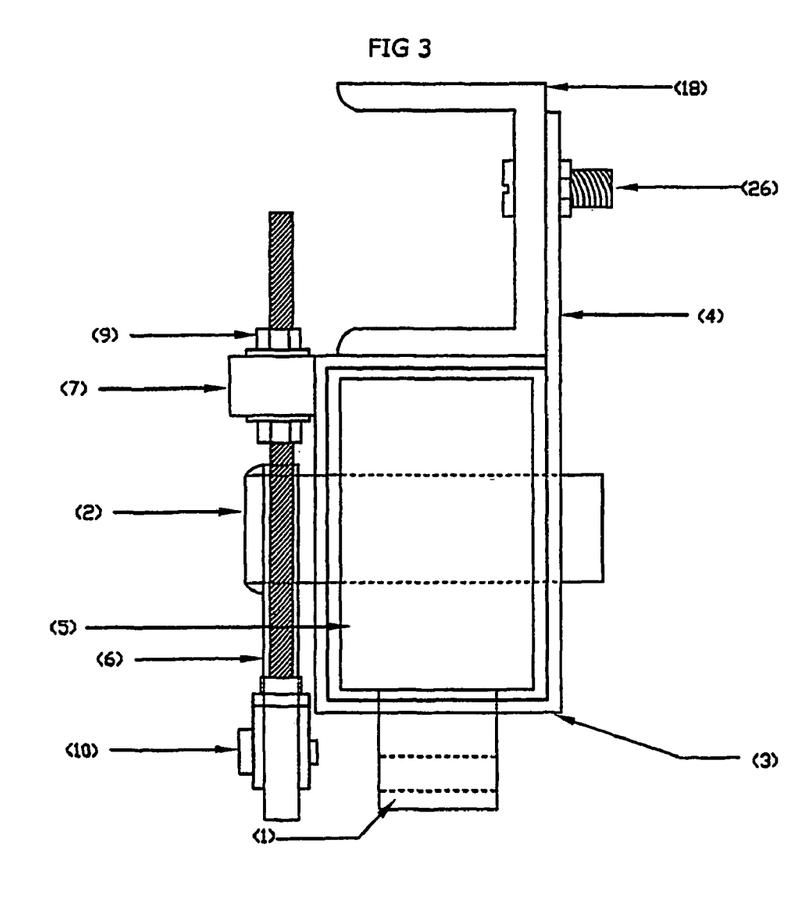
FIG. 3 shows a rear view of a stage loaded and installed in the chassis.
Figure 5:
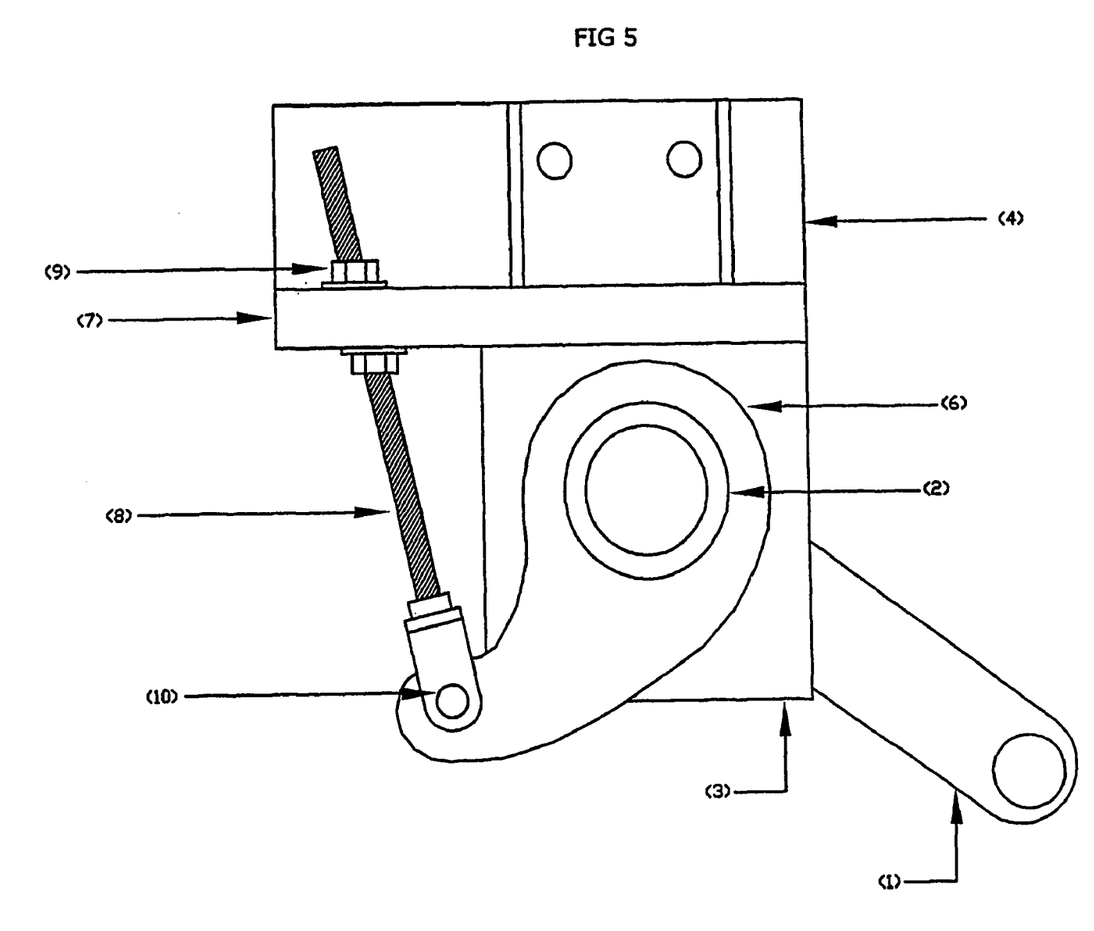
FIG. 5 shows the lateral view of a suspension of two stages integrated with loaded rubber.

Number (23) in FIG. 6 identifies the actuators fixed to the first and second stages which are separated and they serve to determine from what quantity of movement and loading the two stages will act as only one stage. Number (24) in FIG. 4 identifies the run limit of the lever that determines the amount of movement allowed in the first stage in conjunction with the springs of metallic sheets. Number (25) in FIGS. 5 and 6 are triangles of steel plate use to make the suspension box structure act as a rigid body. Number (26) in FIGS. 3 and 6 are holding screws or steel threaded bolts with nuts and washers and they are used to fix suspension box base and covering (3) and (4) in FIGS. 1 and 2 to the chassis (18) in FIG. 4. Number (27) in FIG. 8 is a holding bar or metal rectangular tube and it serves to hold the axle in a fixed position with respect to the front hangar (21) in FIG. 4 and to transmit the force of the axle reaction (17) in FIG. 4 to the swing (20) in FIG. 4.

One aspect of the present invention is an auxiliary suspension system using stages of loaded rubber applied to axles of vehicles in general. The upper part comprises a box or a bent steel plate with a hole in the center that serves as a support to the parts which are attached to the box base located in the lower part. There is also a steel plate with three holes, two of equal diameter that serve as fastening points and one of a bigger diameter that serves to hold an anchoring tube when the unit is assembled. This plate is screwed on the chassis of the vehicle, and it also includes a lever that transmits force coming from the axle to a reaction tube, where the wheel is assembled through the springs of steel sheets which are attached to the lever through a swing. The system also includes an anchoring tube or steel tube that transmits to the vulcanized rubber, anchored on its outer surface, an angular movement, which causes the rubber to stretch until reaching the desired adjustment point. The reaction tube receives force coming from the lever and it transmits it to the rubber contacting its inner surface causing it to generate a reaction force that balances the system.

The system also includes a torsion lever that changes the longitudinal movement of a tensioning element into an angular movement that transmits to the anchoring tube to stretch the rubber, and a torsion arm or crossbeam that is attached to the covering box at one end and having a hole through it for passing a fork-shaped tensioning element. The torsion arm provides an attachment point for the tensioning element and it is also used to generate a longitudinal movement that permits the adjustment of the rubber torsion to the desired level such that the suspension operates properly.

Another aspect of the present invention is an auxiliary suspension system using stages of loaded rubber, for axles of vehicles in general, as described above that also includes two adjustment nuts used to change the circular movement of the nut over the fork-shaped tensioning element into a controlled longitudinal movement and also is used as a counter nut to make sure that the adjustment does not move. A bolt for the fork-shaped tensioning element or a small steel bar is used to join the fork-shaped tensioning element to the tension lever. Also provided is a stop used as a movement limit of the lever arm which determines the working point of each stage, because when the stop prevents the lever arm from moving, this prevents the transmission of more force to the reaction tube and at that point only the second stage is operating, which it is the springs of steel sheets in this case.

A steel crossbeam determines the run limit and holds the suspension box (covering and base of box) to the back hangar that is firmly held to the chassis such that the load is supported. Rubber is applied to contact the surfaces of the anchoring and reaction tubes that is resistant to fatigue, torsion, breaking, etc. As such, the suspension system is balanced throughout the loading range of one or two stages of suspension.

Another aspect of the present invention is an auxiliary suspension system using stages of loaded rubber for axles of vehicles in general as described above including a second stage reaction tube that receives force coming from an actuator attached to the first stage and transmits it to an inner surface which causes it to generate a reaction force to balance the system with the combined forces of the first and second stages. Springs of steel sheets can be used as a second stage when the system is a hybrid system and they have as a purpose to flex themselves and to change vertical movement caused by variation of load or surface into a mixed movement with horizontal and vertical components. An axle is attached to the tires on its ends and the axle is held to the springs through holders and it is used to join floor and suspension. A chassis or rigid steel frame is fixed over the suspension box, and a shock absorber can be used to reduce the shock and speed of vertical movement. A swing with rubber or nylon bushings couples the springs and the lever, and back and front hangars or steel parts held to the chassis are used to support the front and back of the suspension.

In some embodiments, actuators attached to the first and second stages are separated and they serve to determine from what quantity of load movement the two stages will act as only one stage. Also, the run limit of the lever combined with the stop determines the quantity of movement allowed in the first stage in conjunction with springs of metallic sheets. In some embodiments, triangles of steel plate are used to make the box structure of the suspension system behave as a rigid body and a supporting bar or rectangular tube serves to hold the axle in a fixed position with respect to the front hangar and to transmit strength of the reaction force from the axle to the swing.

The invention claimed is:

1. An auxiliary vehicle suspension apparatus comprising:
   a central shaft;
   an outer housing;
   an elastomer disposed between said central shaft and said outer housing forming a flexible spacer, wherein radial displacement between said central shaft and said outer housing applies torsion to said elastomer;
   a stop member attached to said outer housing to retain torsion in said elastomer;
   a first lever attached to said central shaft, wherein movement of said first lever causes said central shaft to be displaced radially such that torsion is applied to said elastomer;
   a threaded shaft attached to said first lever; and
   an adjustable nut on said threaded shaft allowing said shaft to be adjustably mounted to a support member.

2. An auxiliary vehicle suspension apparatus comprising:
   a central shaft;
   an outer housing;
   an elastomer disposed between said central shaft and said outer housing forming a flexible spacer, wherein radial displacement between said central shaft and said outer housing applies torsion to said elastomer;
   a stop member attached to said outer housing to retain torsion in said elastomer;
   a first lever attached to said central shaft, wherein movement of said first lever causes said central shaft to be displaced radially such that torsion is applied to said elastomer; and
   a second lever attached to said outer housing, wherein said second lever is attached to a vehicle spring mechanism which forms a second stage of a vehicle suspension system.

3. The apparatus of claim 1 wherein said elastomer comprises a compound of natural and synthetic rubber that has been vulcanized.

4. An auxiliary vehicle suspension apparatus comprising:
   a central shaft;
   a first outer housing;
   a first elastomer disposed between said central shaft and said first outer housing forming a first flexible spacer, wherein radial displacement between said central shaft and said first outer housing applies torsion to said first elastomer;
   a second outer housing;
   a second elastomer disposed between said central shaft and said second outer housing forming a second flexible spacer, wherein radial displacement between said central shaft and said first outer housing does not apply torsion to said second elastomer in a first range of movement and does applies torsion to said second elastomer in a second range of movement;
   a stop member attached to said first outer housing to retain torsion in said first elastomer;
   a first lever attached to said central shaft, wherein movement of said first lever causes said central shaft to be displaced radially such that torsion is applied to said first elastomer;
   a threaded shaft attached to said first lever; and
   an adjustable nut on said threaded shaft allowing said shaft to be adjustably mounted to a support member.

5. The apparatus of claim 4 wherein said first elastomer and said second elastomer comprise a compound of natural and synthetic rubber that has been vulcanized.

6. An auxiliary vehicle suspension apparatus comprising:
   a central shaft;
   a first outer housing;
   a first elastomer disposed between said central shaft and said first outer housing forming a first flexible spacer, wherein radial displacement between said central shaft and said first outer housing applies torsion to said first elastomer;
   a second outer housing;
   a second elastomer disposed between said central shaft and said second outer housing forming a second flexible spacer, wherein radial displacement between said central shaft and said first outer housing does not apply torsion to said second elastomer in a first range of movement and does applies torsion to said second elastomer in a second range of movement;
   a stop member attached to said first outer housing to retain torsion in said first elastomer;
   a first actuator attached to said first elastomer;
   a second actuator attached to said second elastomer; and
   wherein when said first actuator is in contact with said second actuator, radial displacement between said central shaft and said first outer housing applies torsion to said first elastomer and to said second elastomer; and
   wherein when said first actuator is not in contact with said second actuator, radial displacement between said central shaft and said first outer housing applies torsion to said first elastomer and does not apply torsion to said second elastomer.

7. The apparatus of claim 2 wherein said elastomer comprises a compound of natural and synthetic rubber that has been vulcanized.

8. The apparatus of claim 6 wherein said first elastomer and said second elastomer comprise a compound of natural and synthetic rubber that has been vulcanized.

* * * * *